United States Patent
Ionescu et al.

(10) Patent No.: US 12,086,575 B2
(45) Date of Patent: Sep. 10, 2024

(54) SYSTEM AND METHOD FOR A HYBRID DEVELOPMENT PLATFORM

(71) Applicant: Earthly Technologies Inc., San Francisco, CA (US)

(72) Inventors: Vlad A. Ionescu, Redwood City, CA (US); Alexis Couture-Beil, Victoria (CA); Adam Gordon Bell, Peterborough (CA); Corey Larson, Lehi, UT (US)

(73) Assignee: Earthly Technologies Inc., San Francisco, CA (US)

( * ) Notice: Subject to any disclaimer, the term of this patent is extended or adjusted under 35 U.S.C. 154(b) by 19 days.

(21) Appl. No.: 17/479,729

(22) Filed: Sep. 20, 2021

(65) Prior Publication Data

US 2022/0091830 A1 Mar. 24, 2022

Related U.S. Application Data

(60) Provisional application No. 63/080,395, filed on Sep. 18, 2020.

(51) Int. Cl.
G06F 8/41 (2018.01)
(52) U.S. Cl.
CPC .................. G06F 8/433 (2013.01)
(58) Field of Classification Search
CPC .............. G06F 8/65–70; G06F 8/433
See application file for complete search history.

(56) References Cited

U.S. PATENT DOCUMENTS

| | | |
|---|---|---|
| 2014/0007192 A1 | 1/2014 | Qureshi et al. |
| 2014/0282402 A1 | 9/2014 | Eksten et al. |
| 2016/0134616 A1* | 5/2016 | Koushik ............. H04L 63/0428 726/9 |
| 2018/0173502 A1 | 6/2018 | Biskup et al. |
| 2019/0258462 A1* | 8/2019 | Kathmann ............... G06F 9/445 |
| 2019/0339966 A1* | 11/2019 | Moondhra ............ G06F 16/903 |

(Continued)

FOREIGN PATENT DOCUMENTS

CN 110457040 A * 11/2019 ............... G06F 8/41

OTHER PUBLICATIONS

NPL_Prior Art Reference_ Chinese Patent Application Publication_ CN 110457040 A_With line Numbers. (Year: 2018).*

(Continued)

*Primary Examiner* — Ziaul A Chowdhury
(74) *Attorney, Agent, or Firm* — Alpine Patents LLC; Brian Van Osdol

(57) ABSTRACT

A system and method for a hybrid development platform for project development that integrates local and continuous integration (CI)-based building and testing. The system and method can make use of a build cluster, that executes individual commands within build targets; a build cache that stores partial results of previous executions; an artifact and image storage system, that stores and updates artifacts and container images; and a secrets repository that manages local and global project secrets. The system and method function as an automated build platform that enables an execution environment agnostic build platform for development over local development and extended network computing environments.

9 Claims, 12 Drawing Sheets

(56) References Cited

U.S. PATENT DOCUMENTS

2020/0387361 A1* 12/2020 Modeel ................... G06F 8/61
2021/0034413 A1*  2/2021 Ballantyne ............... G06F 8/71

OTHER PUBLICATIONS

Keheliya Gallaba et al. "Accelerating Continuous Integration by Caching Environments and Inferring Dependencies", [Online], pp. 2040-2052, [Retrieved from Internet on May 1, 2024], <https://ieeexplore.ieee.org/stamp/stamp.jsp?arnumber=9311876> (Year: 2020).*

* cited by examiner

```
FROM golang:1.15-alpine3.13
WORKDIR /go-example build:
    COPY main.go .
    RUN go build -o build/go-example main.go
    SAVE ARTIFACT build/go-example /go-example AS LOCAL
        build/go-example docker:
    COPY +build/go-example .
    ENTRYPOINT ["/go-example/go-example"]
    SAVE IMAGE go-example:latest
```

FIGURE 8

SYSTEM AND METHOD FOR A HYBRID DEVELOPMENT PLATFORM

CROSS-REFERENCE TO RELATED APPLICATIONS

This application claims the benefit of U.S. Provisional Application No. 63/080,395, filed on 18 Sep. 2020, which is incorporated in its entirety by this reference.

TECHNICAL FIELD

This invention relates generally to the field of software integration technology, and more specifically to a new and useful system and method for a hybrid development platform.

BACKGROUND

As software development has progressed, building and testing new applications and projects has become a challenge that needs to be consistently solved over multiple computer operating environments, and efficiently and consistently incorporate the work of multiple developers throughout the process. Building and testing generally takes place both locally and over continuous integration networks.

In software engineering, continuous integration (CI) is the practice of executing a build, including compilation, unit testing, and integration testing (and possibly other types of tests as well), on every change of the code; or at set time intervals of developers' working copies of the code and/or of the shared "mainline" version of the code. CI provides a large and comprehensive network for development but is limited on how fast a build may be iterated on, due to CI systems taking a long time to initialize the appropriate environment and to execute the necessary tests.

Local development, on the other hand, is fast to iterate on, but is comparatively significantly limited in resources. Additionally, local development may create issues that are operating system (OS) specific, machine specific, configuration specific, or execution environment specific. These different conditions can introduce variability across different local machines making it difficult to develop and integrate with a CI network.

There is a need in the field of software development to create a new and useful system and method for hybrid development that incorporate the advantages of both local and CI development. This invention provides such a new and useful system and method.

BRIEF DESCRIPTION OF THE FIGURES

FIG. 8 is an exemplary build file.

DESCRIPTION OF THE EMBODIMENTS

Figure 1:
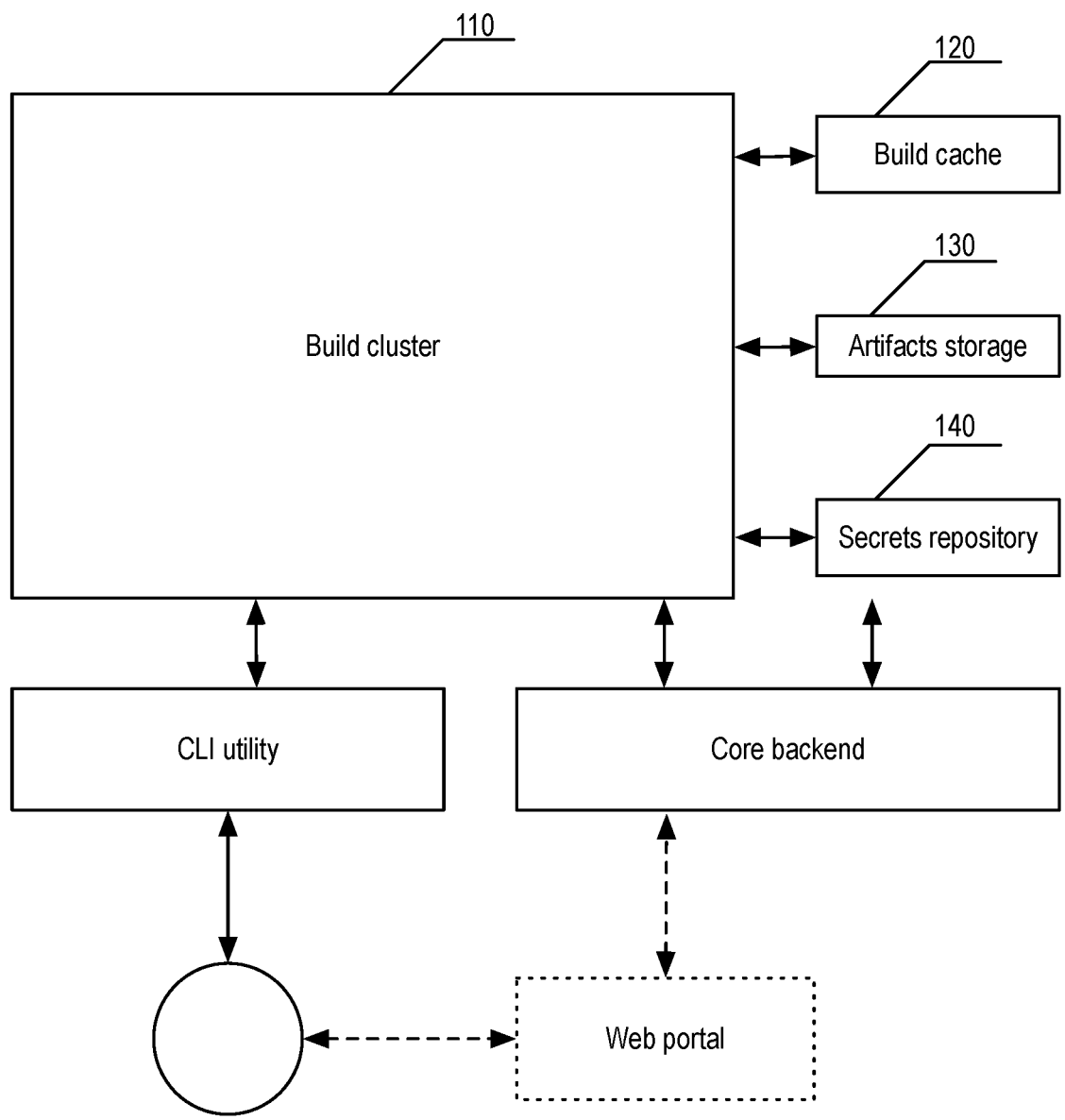
FIG. 1 is a schematic representation of an example system.

The following description of the embodiments of the invention is not intended to limit the invention to these embodiments but rather to enable a person skilled in the art to make and use this invention.

1. Overview

A system and method can enable a dynamic and intelligent code development build process, which functions to enhance the build process when developing software applications. The system and method can make use of a build cluster, that executes individual commands within build targets thereby maintaining and updating project builds; a build cache that stores partial results (e.g., intermediate execution states) of previous executions; an artifact storage, that stores and updates artifacts; and a secrets repository that manages local and global project secrets (e.g., passwords, infrastructure keys, API keys, credentials, etc.). The system and method function as an automated build platform that may enable an execution environment agnostic build platform for development over local development and/or extended network (e.g., cloud based) computing environments. This may be done by leveraging container-based compilation and execution of program segments with explicit linear dependencies to provide a highly optimized and personalized project development platform that may interdependently implement both local and cloud based program segments in a highly reproducible fashion.

The system and method can enable an automated development build solution that can manage builds that may be containerized, isolated, repeated, and executed in an execution agnostic environment. In this way, a build of the system and method could be generated on a local development environment or with a CI and the build can run the same way. This technical solution may enable faster iteration on build scripts and easier debugging during the code development process. The system and method can function as an automation layer between language-specific tooling (e.g., tooling like maven, gradle, npm, pip, go build) and the CI build spec.

The system and method can integrate the use of caching into the build process. In this way, the build output can be reused if that step or any of its inputs have not changed. The cache may additionally be distributed such that caching of the build process can be distributed across the build cluster itself, to help with cache locality, or over any other distributed compute or storage resource. This may be useful for accelerating the build process within an organization of multiple developers.

The system and method can enable self-contained builds, which functions to enable the builds to work across different environments.

The system and method can also enable dynamic parallelization for the build process. In this way, the system and method can automatically execute targets in parallel. In the event a build has independent steps, the system and method can build a directed acyclic graph, isolate execution of each step, and run independent steps in parallel. The system and method may additionally cache results for future use. More specifically, in some variations, every command that executes in response to configuration of a build instruction file can be a container. The build can be defined by building the graph as described above. Since the commands can be run anywhere because of the containerization, the DAG can be used to distribute the build process across a diversity of computing resources (e.g., a computing cluster). The system can handle inferring which steps can be parallelized and which are dependent and cannot be parallelized based at least in part on the nodes in the graph.

The system and method can enable an intelligent import system that can enhance the management of artifacts across repositories. The system and method may be used to copy or otherwise manage artifacts across repositories with an appropriate command configured in a system build language used by the system and method.

The system and method may be used in a variety of exemplary use cases.

In a first use case, the system and method can provide a local development platform; wherein project and project components may be created, updated, compiled, and executed locally.

In a second use case, the system and method can provide a "cloud based" development platform; wherein project, and project components, may be created, updated, compiled, and executed on cloud-based, or other public/global computing platforms. In one such exemplary use case, the build process of the system and method may be integrated with a source code repository. For example, a build process of the system and method could be triggered in response to a webhook request from a code repository after a pull request is issued. Such an implementation can make use of the intelligent and dynamic build process of the system and method for a more performant build process.

In a third use case, the system and method can provide a hybrid development platform; wherein project, and project components, may be created, updated, compiled and executed either (or both) locally and on cloud-based computing platforms. As part of the hybrid use case, the system and method may enable selective implementation of local and cloud-based platforms, wherein the system (or user) may selectively choose between local, cloud-based, or hybrid implementations for project component creation, compilation, and/or execution. For cloud-based and hybrid implementations, the system and method may additionally enable implementation with continuous integration (CI) and other group development platforms. For local implementations, the system and method may further provide CI capabilities (e.g., access to global resources).

The system and method may provide a number of potential benefits. The system and method are not limited to always providing such benefits and are presented only as exemplary representations for how the system and method may be put to use. The list of benefits is not intended to be exhaustive and other benefits may additionally or alternatively exist.

The system and method provide the benefit of local and CI builds. That is, the system and method provide enough information for CI needs, but also enable sub-steps independently or with altered parameters for local development builds.

In typical development, builds are operating system specific and not readily compatible with popular development workstations. The system and method provide containerized targets thereby minimizing OS-level dependencies and potentially improving build reproducibility through platform agnostic execution.

Additionally, the system and method may provide the ability to run containers over all major platforms, thus a build on one platform may be more easily compatible for other platforms.

As another potential benefit, the system and method can make use of explicit dependencies between build targets enabling ease of use for both local and on CI platforms. Additionally, local builds do not affect external systems or services unless explicitly requested.

As a build specification (i.e., "build spec") can be explicit about dependencies between targets and reduce or eliminate other sharing, the system and method may enable easy parallelization that is easy for the user to reason about. The user does not have to think of race conditions, locking shared memory, dead-locking or classical concurrency bugs resulting from the difficulty of working with shared resources in a concurrent environment.

As one potential benefit, in order to sustain the reproducible builds key feature, the system and method further extends the concept of securely stored secrets to make the secrets available to local builds too.

The system and method may enable explicit labeling and declaring of artifacts or target images thereby improving interaction with artifacts.

As an additional benefit over Dockerfiles and other similar container technology, the system and method may provide the benefit of enabling building all types of artifacts (e.g., regular files, executables, libraries, etc.) and not just Docker images.

A key limitation which almost all CI systems today have is that given a set of changed files, the CI system cannot automatically infer which integration tests need to be re-run. This often results in running too many integration tests, thus slowing down build times, which impacts developer productivity while also wasting computing resources. The system and method provides the potential benefit of automatic inference of which integration tests to re-run. By leveraging explicit dependencies, the system and method may track the propagation of known modified files across build mappings to infer which targets are affected by the changes and thus would need to be executed again.

Additionally, the system and method may enable different groups/teams to run each other's builds, i.e., improve reproducibility, thereby potentially providing an efficient way of adding new team members to a project.

2. System

As shown in FIG. 1, a system for a hybrid capable development platform includes: a build cluster 110, comprising circuitry that creates and maintains program builds and build components; a build cache 120, comprising circuitry that caches build components; an artifact and image storage system 130, comprising circuitry that stores build artifacts (e.g., docker images and binaries); and a secrets repository 140, comprising circuitry that stores and manages build secrets. The system functions as a local, cloud-based, or hybrid development platform that enables software development locally (e.g., personal workstation) and/or over an extended network (e.g., cloud). The system may be implemented as a build automation tool allowing users to execute builds in containers, making build executions self-contained, reproducible, portable and parallel; over local, cloud-based, and/or hybrid executions.

Dependent on implementation, the system may further comprise additional components as desired for additional functionalities. Examples of some preferred additional components include: a command line interface (CLI) utility that enables user interaction with the platform; a system language (e.g., a proprietary or open-source language optimized for use and interaction with the system), enabling textual description and configuration of builds; a core backend that comprises the core logic for the development platform; and a web portal providing external interaction. The system may include other components as desired. Examples of other components include: a graphical user interface (GUI), messaging application and security modules (e.g., firewall, encryption/decryption tools). Dependent on implementation, the system may particularly include integration tools to work in conjunction with continuous integration platforms (e.g., integrate with Github).

The system may further include build tools for use of the platform. Build tools may include but are not limited to: command-line utility, which may enable platform control via the use of command line commands and flags; and a referencing system to refer to artifacts, images, and other targets within the system. Build tools may be added and/or removed from the system as desired per implementation (e.g., language development tools made available for use through purchase). A build tool could be installed in a local development machine or within server.

The build tool could include a CLI utility and/or a graphical user interface. The interface of the build tool preferably reads, or processes build files in determining the nature of a build. A build file can be configured in a system language. As shown in the example build file shown in FIG. 8, the build file can define a series of build steps that can be processed and used in implementing the build process. As described herein, the system may intelligently process the build file to determine scenarios where it can appropriately cache and parallelize the build process.

Figure 2:
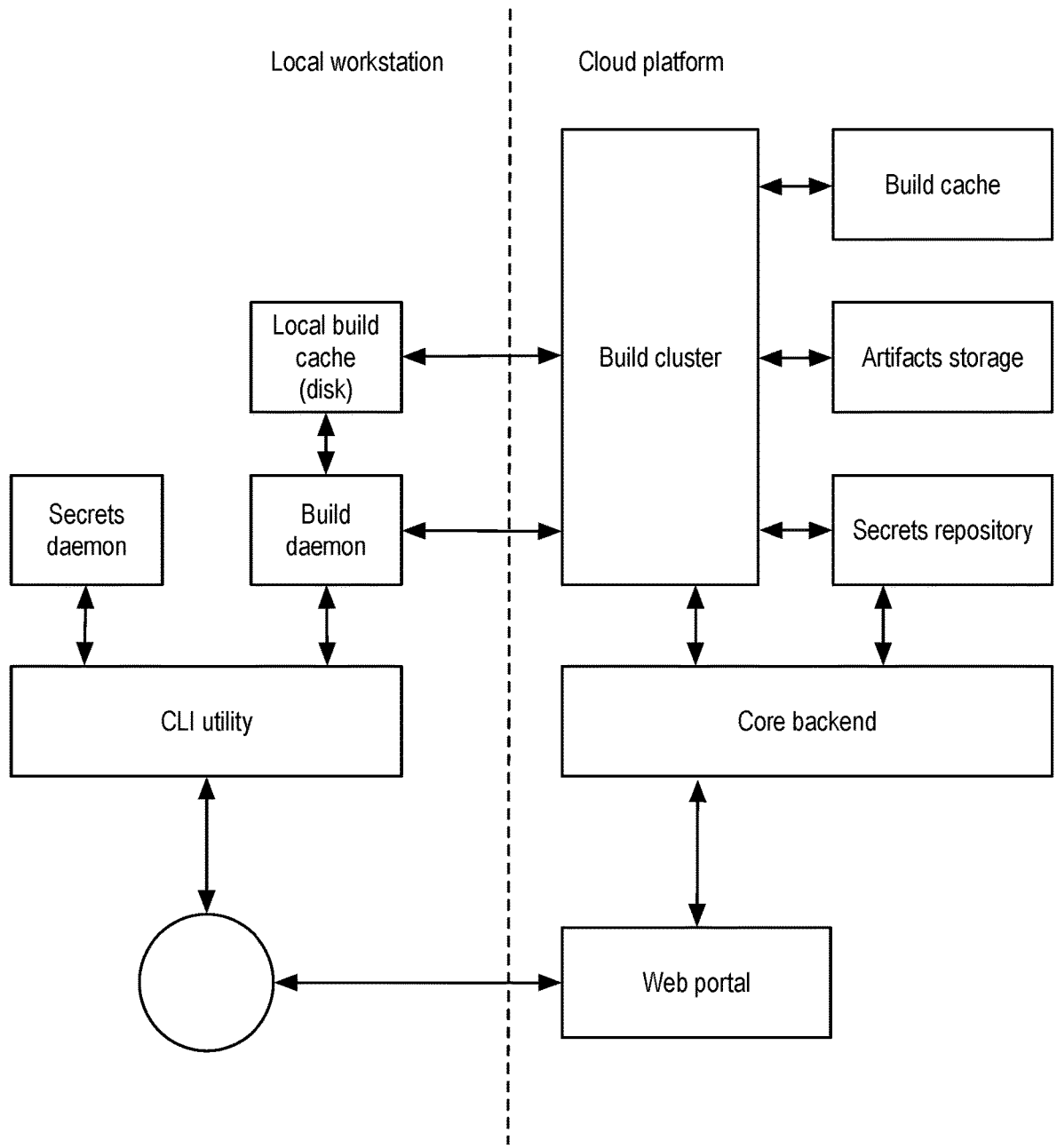
FIG. 2 is a schematic representation of an example hybrid system.

As a hybrid development platform implementation, the system may provide multiple use cases: a local development platform, wherein a user may implement the system for local software development; a network-based development platform (e.g. a continuous integration (CI) system, wherein multiple users may work independently or collaboratively; or a hybrid development platform enabling both local and cloud based implementation. The system preferably enables implementing any of these use cases and switching between them over any given project or time period. Dependent on implementation, the system may comprise additional components, or provide local or network variants of system components. As shown in the example schematic of a hybrid implementation in FIG. 2, system components may be localized, duplicated, and/or specialized for local, cloud based, or hybrid development. For example, a build cache may be a local build cache, a network-based build cache, or a build cache with local and network components. As part of any use case, the system may be implemented as a usable development platform, wherein a user may access the system locally (e.g., installed software) and/or access the cloud-based platform. In some variations the system may be provided as part of software as a service (SaaS).

As part of a cloud/network-based implementation, the system may function as a CI system, or as a build system used with a CI. In these variations, all build steps may be executed exclusively in the cloud; operations that modify the external state would be enabled by default (but may be configurable) and would typically be triggered without human interaction. Additionally or alternatively, the system may enable utilization of source control management (SCM) systems, Docker image (or open-container image) registries, and package repositories.

As another application, the system may also be used to extend the hybrid builds. As part of a hybrid use case (i.e., both local and cloud implementation), the system may intelligently decide to perform parts of a build project on a local platform (e.g. workstation) and submit the rest to the cloud platform. The user might additionally have the option to force execution within one of these two environments exclusively. The algorithm to automatically decide which parts to run locally and which parts to run in the cloud may be based on implementation. In one example, if no historical data (e.g., no performance data of prior builds) exists or is available, the build project may be submitted to both the workstation and the cloud, in parallel, to establish a performance baseline. This may allow for comparison of the performance of the build locally vs the performance of the build in the cloud.

In hybrid variations, the system may enable use of a combination of resources across the local and the cloud platform. A specialized hybrid development environment may be used for running microservices for development purposes. Use cases may include running a complex stack of microservices for development, debugging, and build reproduction purposes; in an environment that is not limited in resources (e.g., a typical development workstations), but which can be easily reinitialized with updated logic as the developer makes changes to the code. That is, a developer may generally develop in a "local" environment but with access to cloud-based resources.

Figure 3:
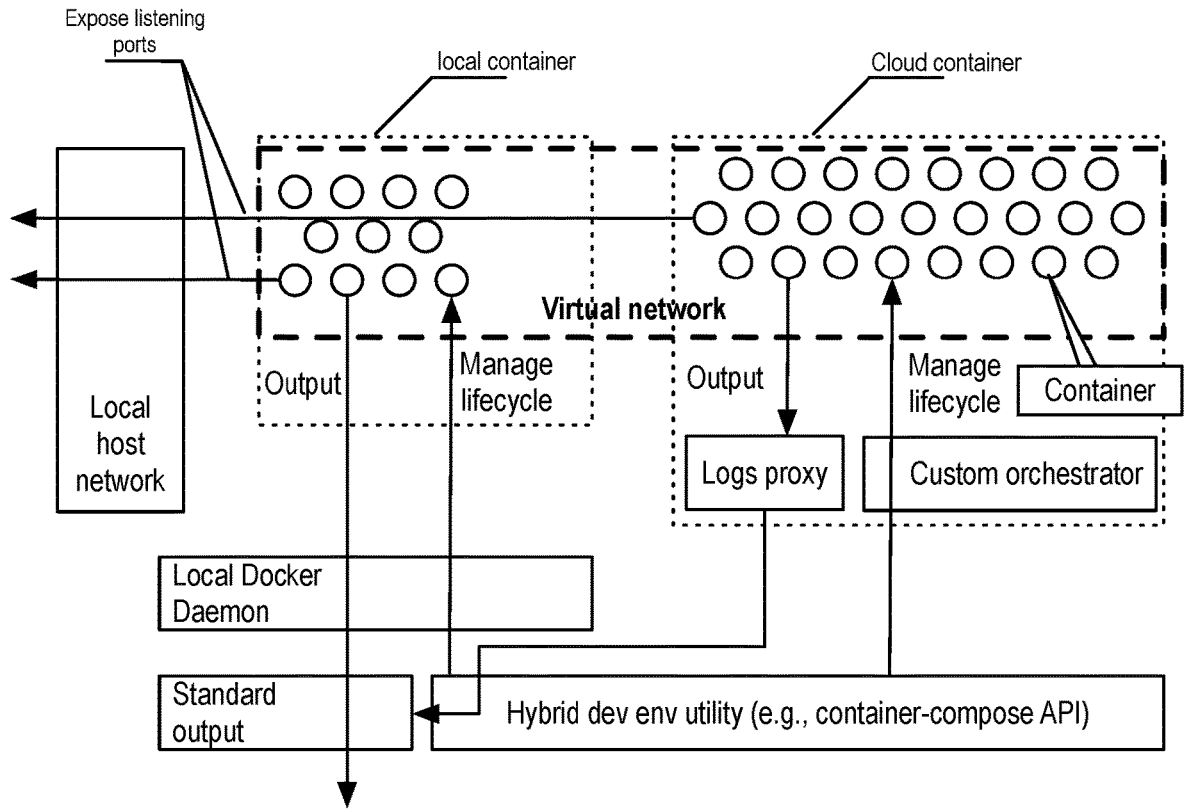
FIG. 3 is a schematic representation of one variation with containerized execution.

As another application, the system may be used to extend the hybrid build system to also enable hybrid execution to stacks of containers, forming a microservice architecture. As part of a hybrid use case (i.e., both local and cloud implementation), the system can further enhance the developer experience by enabling execution environments (e.g., a developer environment) for local and cloud distributed execution. This may be used to enable a hybrid development environment. In a hybrid execution implementation, the system may intelligently decide to start containers on the local platform (e.g., workstation) and submit the rest to the cloud. The user might additionally have the option to force execution within one of these two environments exclusively. The algorithm to automatically decide which parts to run locally and which parts to run in the cloud may be based on implementation. As shown in FIG. 3, one example schematic of local and cloud interactions, a developer may have a local interaction "experience" (through the local host network) while only parts of a container stack are executed locally and while other parts of the container stack are executed on a cloud platform. Other integrations may also be incorporated with the extended hybrid build system. For example, a Docker compose specification or another container orchestration specification can be used in establishing multiple containerized microservices that could be run in local containers or in cloud network-accessible containers. Port tunneling can be used for cloud containers to expose a listening port locally on a developer machine. A unified logging system could use a log proxy in the cloud with an output that is combined with the local output. Furthermore, the local and cloud containers may be run within a shared virtual network. In some cases, a management or orchestration system can manage the distribution of local and cloud microservices to enhance performance or based on other metrics.

Figure 5:
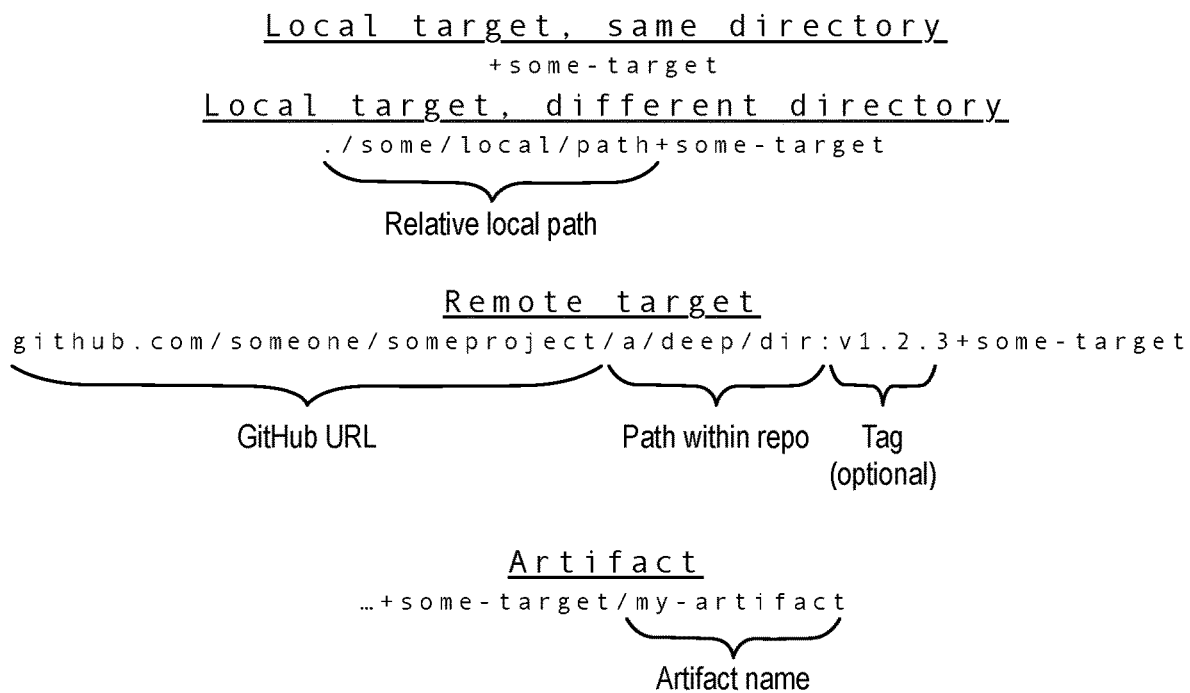
FIG. 5 is an example of target and artifact reference syntax.

For hybrid microservice variations, microservices running in the cloud may stream their logs, standard inputs and outputs to the developer's workstation. Additionally, in some variations, ports opened by the various microservices may be forwarded back to the user's workstation such that they may access them via localhost. This may create a near "seamless" experience of interacting with the microservices for the user for debugging, testing, and development purposes, since it does not typically matter whether the microservice is running locally or in the cloud. The decision of which microservices to run locally and which ones to run in the cloud may either mirror their respective builds, as shown in the sample script in FIG. 5 (e.g. if the build of a microservice is executed locally, the microservice is run locally), which may help minimize the need to transfer microservice images to/from cloud) or have some other decisioning algorithm (e.g., microservices execution allocated by processing capability). Such a system may optionally support the Docker-compose specification (a widely used format for defining container stacks for local development) or the Kubernetes configuration format for defining microservices and the possible interaction between them. The system may additionally, or alternatively, support any other configuration or format used for defining microservices, including user defined configurations. This microservice system may be integrated with the build features of the system, such that whenever a new build of a microservice has succeeded, the respective microservice is reinitialized (either automatically or when given a command by the user).

Figure 6:
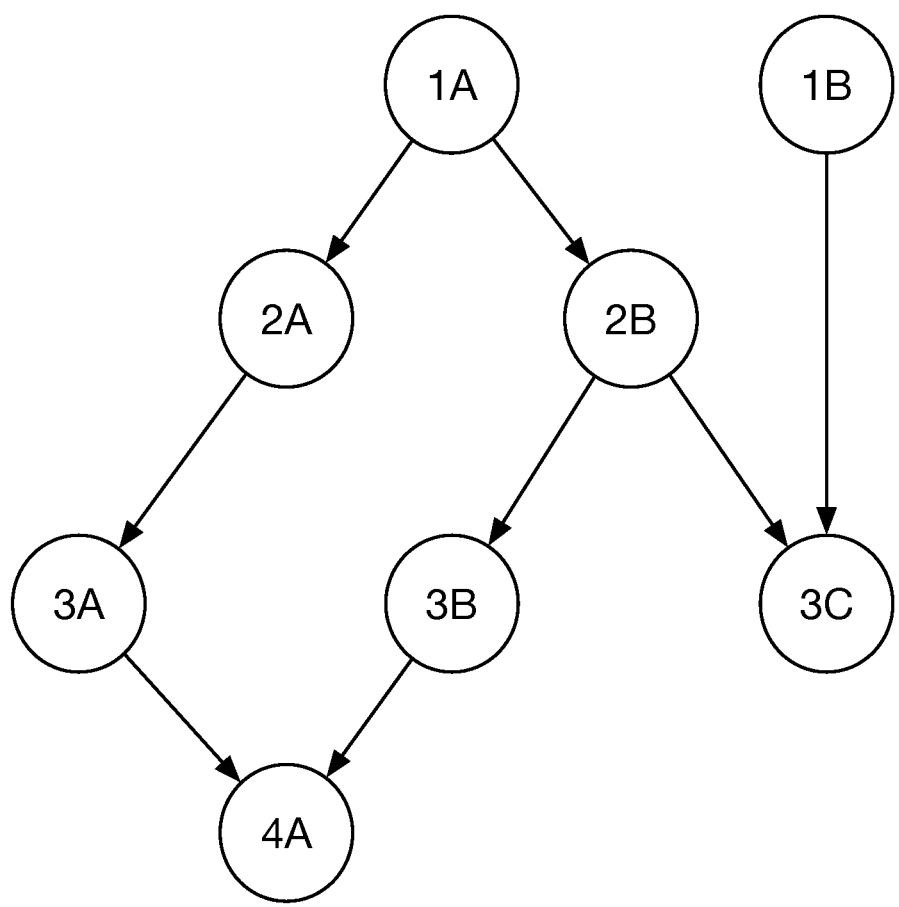
FIG. 6 is a schematic representation of directed acyclic graph (DAG) build mapping.

As shown in FIG. 6, one implementation of a hybrid development environment can use a hybrid development environment utility, a set of containerized microservices (represented as circles in the figure) that are partially operated locally on a development machine (e.g., a developer's personal computer) and remotely in a cloud computing environment. The hybrid development environment utility can function as a utility on a developer's local machine that facilitates and manages hybrid development environment. In some variations, the hybrid nature of the deployment is transparent to the end user. In some variations, the hybrid development environment utility can be a container-compose API where container-library-like commands (e.g., Docker-like commands) can be issued but with local or cloud deployment of a container for a microservice being managed by the utility. As shown in FIG. 6, a customer orchestrator may facilitate container/microservice management on the cloud, and a local container daemon may manage lifecycle of containers locally. The state of the build resulting from the system may be used. For example, local builds can be deployed locally, and cloud builds can be deployed remotely. Alternatively, other factors may be considered when determining between deploying locally or remotely. In some variations, location may be fully or partially configurable (e.g., based on a hybrid configuration file).

The hybrid development environment can include a virtual network such that containers are operated to appear and function as if on the same network. The set of containerized microservices can be run within the shared virtual network. To facilitate unified local access to network ports, the local and remote containers expose listening ports through the local host network. If a local container, ports are exposed as expected for local containerized microservice. If a remote cloud container, the system tunnels open ports from remote containers back to local machine. This may enable, for example, a developer using a local machine to load in web app from a local host network to test behavior while using a hybrid environment Various features of development can be unified across local and cloud such as logging. In one variation, if logs are generated by a local container, then the log can be output directly through the standard output of the local machine. If the logs are generated by a cloud container, the logs can be streamed from the cloud container to the standard output. In one variation shown in FIG. 6, logs of a cloud container are streamed through a log proxy, and a hybrid development utility to the standard output.

In some variations, the system may be used as a CI platform integration, wherein the system functions to improve and enhance CI capabilities for project development. These enhancements may include providing CI benefits for local development (e.g., reduce compilation/execution processing overhead), and improved capabilities for the CI platform (e.g., provide a more consistent build environment for a more reliable execution over platforms, and allow small component executions instead of a monolithic CI script execution). As a general part of the system function, the system breaks down a build into individual executable components (e.g., commands) such that each executable component is run in a container, where a linear interdependency of the containers is enforced and mapped. These containers effectively function as an execution sandbox, providing a consistent build environment over all platforms. In some variations, each executable component may also be stored in a distinct container. The fine breakdown of code into individual containers, enables execution of individual target components instead of a monolithic CI script execution. The system may be used as part of any CI platform integration. Examples of CI tools/platforms that may be integrated with the system include, but are not limited to: GIThub, Buddy, Jenkins, TeamCity, BigEVAL, GoCD, Bamboo, Gitlab CI, CircleCI, Codeship, Buildbot, Integrity, Strider CD, Autorabit, Final builder, Wercker, Buildkite, Semaphore, CruiseControl, Bitrise, Travis, and Urbancode.

As part of the CI integration, the system may include tools to connect to a CI, integrate with the CI, and update a build and build dependencies on the CI. The tools may include build tools (e.g., make, maven, gradle), for local and global builds.

The system of may include a build cluster 110. The build cluster 110 functions to execute individual commands within build targets. The build cluster may isolate targets of a project build, such that targets of the project may be executed separately from other targets of the project; wherein targets are recipes/commands. Thus, the build cluster 110 may further functions as a sand box for execution of containers of a build; wherein execution may comprise one, multiple, or all containers for a build.

Figure 4:
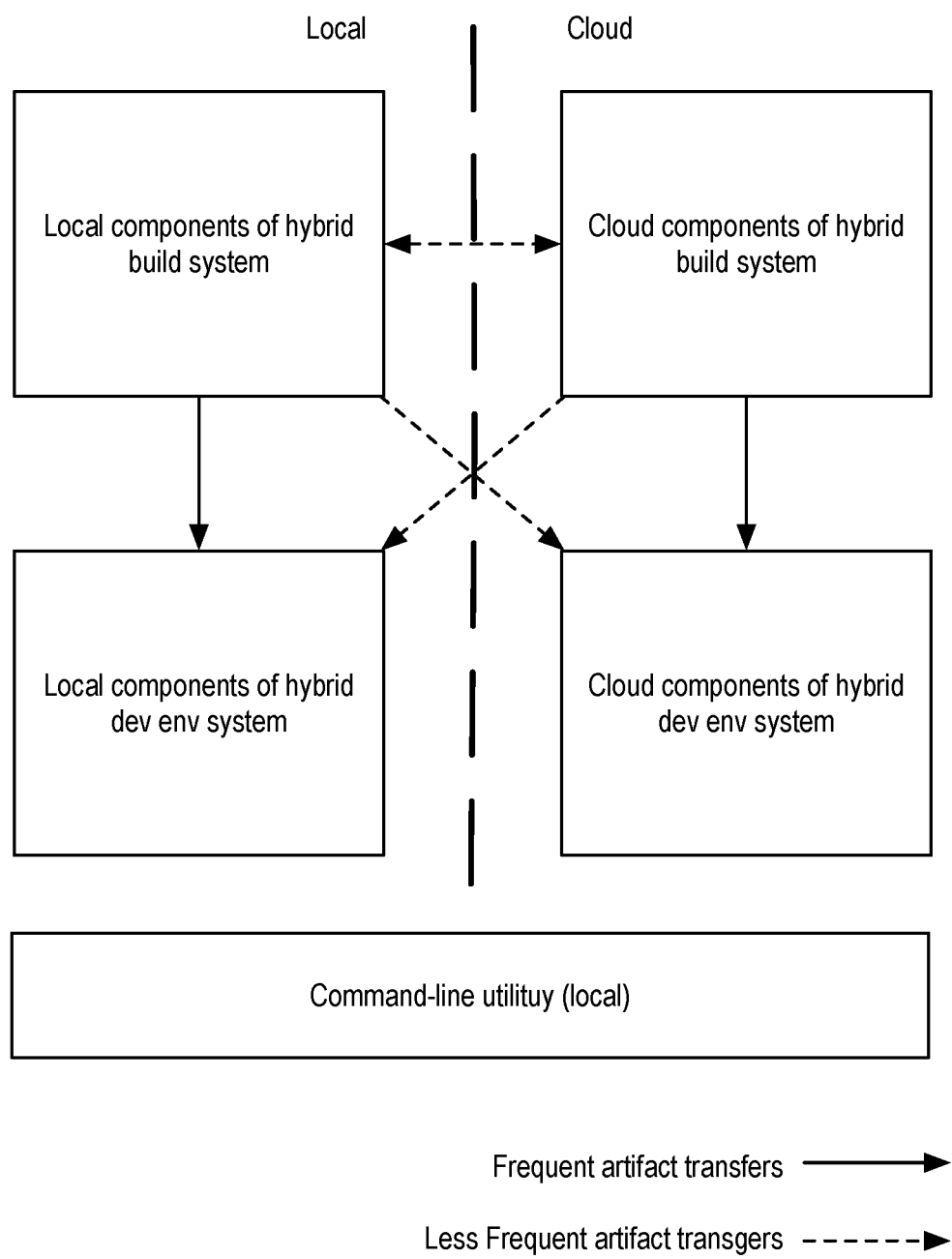
FIG. 4 is a schematic example of the hybrid development platform.

In multi-tenant implementations, the build cluster 110 may additionally function to isolate the same target for distinct users of the platform. That is, the build cluster 110 would containerize, and thus isolate, a single target execution separately for each user. In some variations, the build cluster 110 may enable partial isolation of a target between tenants. For example, a specific project group may be designated to share the same build and execution for a set of targets for some project. In this manner, each build node in the build cluster can be sandboxed per-user in a manner in which they are not allowed to communicate with build nodes of other users. Similarly, each remote container in the hybrid development environment example for a single user, as shown in FIG. 4, can be expanded and sandboxed per-user.

Dependent on implementation, the build cluster 110 may comprise local (e.g., workstation, local computing cluster, local mainframe), and/or network circuitry (e.g., cloud computing cluster, public network, etc.). In this manner, the build cluster 100 may comprise circuitry ranging from one to thousands of machines. For some hybrid and cloud implementations, the build cluster 100 may comprise 100s-1000s of processors. In many variations, the build cluster 110 may function as a computation resource pool that may be automatically scaled up or down to meet real-time demand.

In some preferred variations, each target is isolated from all other targets in containers (i.e., containerized), thus enabling environment agnostic reproducible execution. Preferably, only "desired objects" are shared between targets, wherein desired objects comprise target dependencies. Particular desired objects may be preset as a variation of the system (e.g., as rules for target dependencies), and/or may be changed per implementation. For example, in one variation, only explicitly declared artifacts (e.g., regular files and directories) and images (e.g., docker images) are shared between containers.

The build cluster 110 may additionally ensure and require explicit and linear dependencies between targets. That is, dependencies are explicitly declared and enforced to be unidirectional (i.e., no circular dependencies). Explicit, linear dependencies may enable easier identification of the dependencies of a target thereby identifying which targets may need to be updated in conjunction with the target. As shown in the FIG. 6 schematic, where targets are represented as nodes and dependencies are represented as directed lines, linear dependencies may enable dependencies to branch "out" and branch "in", but not form loops.

In some variations, the build cluster 110 may additionally create a build mapping (also called build graph) of all targets to identify and direct dependencies. Accordingly, the system can include a build mapping. As there are only linear dependencies with no loops, the build mapping may lend itself to a direct acyclic graph (DAG), although any other graph or type of mapping may be implemented. In one variation, as shown in FIG. 6, a series of sequential commands in a build specification can be used in determining a directed build mapping. Each command can form a vertex in the graph, where a vertex depends on the previous command in a sequence of commands (e.g., a recipe). A build target can be based on a series, or set, of such commands. Alternate build mappings may be used to delineate targets and their dependencies. As desired, the build mapping may include additional information. Examples of additional information may include, target name, target identifier, dependency identifiers, data checking tools (e.g., checksum), target properties (e.g., function call), edit history, library associations, etc.

The build graph may not be unique for a particular project. That is, it may be possible for one project to generate distinct build graphs. Additionally, the build mapping does not need to be completely defined at the beginning of the build. Depending on certain intermediate outcomes or conditions during the build, the resulting build mapping may vary from build to build of a single project. For example, in one case, the build may create two intermediate artifacts of a certain type, each of which may trigger two separate target deploy processes. In another case, the same build specification may generate three intermediate artifacts of a certain type, each of which may trigger three separate target deploy processes. In both of these cases, despite the build specification being the same, the build mapping may end up being different on different invocations. Dependent on implementation, a complex build mapping may be defined using the build specification, or several such build "files" that depend on each other. These may span several repositories, possibly covering the entire codebase of an organization.

In some variations, the build mapping may include a target graph. The target graph is a directed graph of all the targets involved in a build. The target graph may provide a higher-level overview of the project build. The edges of the graph represent dependencies. In some variations, target graph may be distinct from the build graph. For example, the build graph may represent individual commands within the build, whereas the target graph represents whole targets (e.g., recipes). In the target graph, each vertex represents a target together with a digest of the build inputs used in that target. Thus, the same target may be included as multiple vertices in the target graph, wherein each vertex would represent the target with a potentially different set of parameters.

For each connected subgraph of the target graph, the target graph may calculate an estimate of the time saved by performing the subgraph on the cloud (as opposed to locally). The estimated time calculation may take into account many factors, such as the time to transfer artifacts (e.g., depending on historical artifact sizes), connection bandwidth (e.g., internet bandwidth) and available processors capacity. The target graph may then select the subgraph with the most time saved. In this manner, all targets in a subgraph may be executed in the cloud while the rest of the targets of the target graph are executed locally. In some variations, the build mapping may be used to calculate an estimate of the time saved. In addition to factors mentioned for target graphs, this "estimated time calculation" may take into account the time required to execute command steps of the build mapping.

Explicit linear dependencies with isolated containers may enable the build cluster to independently execute segments of code; such that, to update a desired target, only that desired target and targets "downstream" (i.e., dependencies and all proceeding dependency chains) of the desired target may need to be updated. That is, the build cluster 110 may leverage the build graph to determine which targets need to be executed once a segment of code is updated. Additionally or alternatively, the structure of the build graph may be leveraged to incorporate efficient execution of the build, particularly with respect to parallelization of the build execution. For example, in some DAG build mapping variations, the system may parallelize target executions whenever the DAG "fans out" (i.e., two edges exit from a single node). To reiterate, as the build specification is explicit about dependencies between targets, as seen on the build mapping, and nothing else is shared; parallelization may become easier to implement for the user. The build may be executed in parallel on a single node, or across a cluster of build nodes. The structure of the build mapping may inform which parts can be executed in parallel and which ones depend on each other and thus would need to be sequential. Edges fanning out of a vertex can trigger parallelism, while edges fanning in may inform the system to wait for all the dependency vertices to finish executing prior to continuing. In some variations, the build cluster 110 may also efficiently incorporate wait times whenever the DAG "fans in" (i.e., multiple edges enter a single node). Dependent on implementation, wait times may be used to adjust resource allocation for build execution. In some variations, the build mapping may thus act as a workflow graph for the purpose of distributing and guiding computation in a cluster, artifacts and images shared between targets are similar to messages passed between actors in a distributed actor model.

The system may include a cache system 120 (or build cache). The cache system 120 functions to store the intermediate states of the build and associated build mappings. The cache system 120 stores the state of the build at each vertex of the build graph. The system may leverage the properties of the build cluster 110 (i.e., explicit linear dependencies and isolated target execution) with the cache system 120 to provide layered storage and layered compilation and execution via the build mapping. That is, if a build state has been previously created, the digest will match, and the build state can be recovered from the cache system 120, without having to be executed again.

Dependent on implementation, the cache system 120 may include local (e.g., local hard drive) and/or global (e.g., project repository) components. That is, the cache system may include local and/or global storage circuitry. The cache system 120 may comprise any desired data/media storage medium that may be accessible to the system. Examples include: main memory (e.g. RAM), secondary storage (e.g. hard disk drives, solid-state drives), tertiary storage (e.g. cloud storage, nearline storage), and off-line storage. The cache system 120 may be local, internet-based, dispersed, and or situated in any other desired positioning. In some variations, the cache storage is a key-value storage, wherein the key is a content-addressable digest of the vertex, and the value is the state of the build, serialized in a manner that can be stored on the cache system (e.g., hard drive or on a cloud-based blob storage). Using a copy-on-write file system, most cached states can be expressed as a previous state and a delta in a manner that is highly efficient (from the perspective of data space occupied and also from the perspective of the time taken to "write" the data). In some variations the cache system 120 may exist fragmented across one, or multiple, clusters of (optionally ephemeral) computing nodes. In this manner the build specifications are not limited to a single directory or a single repository. Multiple target files may be connected to each other via a referencing system, thus possibly creating complex interdependencies between directories and repositories of an organization.

The cache system 120 may function as layer caching; that is, given a series of sequential commands, the cache system forms a chain in a directed graph (i.e., build graph/mapping). In some variations, each command in a build configuration (e.g., a build file) forms a vertex in the build mapping, wherein the vertex direction may depend on a previous command in a recipe. That is, a recipe is a series of commands, wherein each build target has one recipe. In this variation, every vertex has a content-addressable digest that represents a checksum of the definition graph up to that vertex, including all its inputs. If two vertices have the same checksum, they are considered identical for caching purposes and when they are executed concurrently. That means that if two other vertices request a vertex with the same digest as an input, they will wait for the same operation to finish. Additionally, if the build graph contains cycles, an error is returned to the user, as the build cannot be completed.

The cache system 120 can be used to store the state of the build at each vertex of the build graph. Any desired type of storage may be implemented by the cache system 120 to store the build graph. In some examples, the cache system 120 is a key-value storage, where the key is the content-addressable digest of the vertex and the value is the state of the build, serialized in a manner that can be stored on the hard drive or on cloud-based blob storage. Using a copy-on-write filesystem, most cached states can be expressed as a previous state and a delta in a manner that is highly efficient (from the perspective of hard disk space occupied and from the perspective of the time taken to complete writing). A complex build graph may be defined using a define build spec (e.g., an earthfile build spec), or several such interdependent build files. These build files may span one or multiple repositories, potentially covering the entire codebase of an organization.

The cache system 120 may be layered across multiple locations. In one example, a developer's local computer may contain certain cache entries related to build projects the developer has executed so far on the local computer. Additionally, the cache system may further include a cloud-based cache. The cloud-based cache layering may also be much more comprehensive, containing caches of builds across all the repositories of the organization.

Layered caching may function to enable different, potentially personalized, use cases. For local development, the local cache may be faster for the local build to access, wherein the cloud cache would be much more comprehensive. Using both local and cloud-based cache in combination (first checking the local cache and if not found, then checking the cloud-based cache), project builds, and executions may be optimized for both speed and comprehensiveness. In another example, the cache-system may be layered across different classes of storage mediums. Examples include: permanent (cheaper, but slower) and ephemeral (faster, more expensive, typically limited in size due to cost).

In addition to layered storage, the cache system 120 may enable layered compilation and execution of a build. With updates of a target, the system may detect the need to run a command. In this manner the system may go to the "layer" containing the command and then execute all commands onward from that point based on the build mapping. As there is no need to update prior layers, the prior layers may be directly accessed from the cache system without the need to execute them again. In some CI and hybrid variations layered execution may be implemented in conjunction with layered caching, such that execution occurs on the same machine that the target is stored on. In this manner layered caching may be used to optimize execution. As shown in the example schematic of FIG. 4, the build process may result in building and creation of components locally and/or on the cloud. In some scenarios there may be transfer of components between local and cloud. Then during execution of a developer environment, local components can be run locally and similarly cloud components may be run in the cloud. Components may be transferred between local and cloud, such that components are stored on a local build cache and/or a cloud-based build cache. In some scenarios a developer may set configuration to alter what is stored locally vs. the cloud; and what is executed locally vs. the cloud. A command-line utility can facilitate a unified interface for interacting with such a hybrid system, preferably managing the distributed aspect of the components. In other scenarios, the system may determine what is stored locally vs. the cloud. In one example, the system may determine the user has a high-capacity local storage, with minimal amounts of updates occurring from other users. In this example, the system may prioritize storing and executing locally. In an alternative example, for an active large project with many developers, the cache system 120 may initially store all build information on the network repository for the group. As one user repeatedly accesses certain targets of the build, these components and versions of these components may also be concurrently stored locally for the user.

In another example, the cache system 120 may be shared between multiple users (e.g., within the same organization or work team). For example, if one user has previously built a certain part of a project (e.g., project A), which has not changed, and another user also builds the exact same version of project A, then the cache of the part which has been previously built may be reused without rebuilding it. In some implementations, shared caching between users may be enabled for only specific use cases, as desired. For example, for performance and security reasons, the system may be configured to only reuse a cache between users if it has been generated from a cloud execution (and never from a local execution).

The system may include an artifact and image storage system 130. The artifact and image storage system 130 functions in storing of artifacts and images created by the build cluster 110, thereby enabling an artifact or image to be used as a cache and enabling other tooling systems to use and access artifacts and images for their own purposes. Artifacts and images are preferably explicitly labeled and declared. Additionally in some variations, the artifact and image storage system 130 may monitor artifacts and images and ensure that artifacts are properly updated. Thus, the artifact and image storage system may always keep the artifact or image "fresh" with current builds.

Similar to the cache system 120, the artifact and image storage system 130 may include local (e.g., local hard drive) and/or global (e.g., project repository) components. That is, the artifact and image storage system 130 may include local and/or global storage circuitry. The artifact and image storage system 130 may comprise any desired data/media storage medium that may be accessible to the system. Examples include: main memory (e.g. RAM), secondary storage (e.g. hard disk drives, solid-state drives), tertiary storage (e.g. cloud storage, nearline storage), and off-line storage. The artifact and image storage system 130 may be local, internet-based, dispersed, and or situated in any other desired positioning. In some variations, the storage is a key-value storage, wherein the key is a content-addressable digest of the vertex, and the value is the state of the build, serialized in a manner that can be stored on the cache system (e.g., hard drive or on a cloud-based blob storage). Using a copy-on-write file system, most cached states can be expressed as a previous state and a delta in a manner that is highly efficient (from the perspective of data space occupied and also from the perspective of the time taken to "write" the data). In some variations the artifact and image storage system 130 may exist fragmented across one, or multiple, clusters of (optionally ephemeral) computing nodes. In this manner the build specifications are not limited to a single directory or a single repository. Multiple target files may be connected to each other via a referencing system, thus possibly creating complex interdependencies between directories and repositories of an organization. In contrast to the cache system 120, the artifact and image storage system 130 may comprise recordable media optimized for image and artifact storage.

In addition to storing artifacts and images, the artifact and image storage system 130 may implement any type of artifact and/or image repository (e.g., maven, npm, docker registry). Images comprise docker or container images. Additionally, images may comprise any image adhering to the open-container initiative (OCI) image standard. Artifacts comprise files resulting from executing targets (although not all targets have artifacts). Artifacts may include public or proprietary types of artifacts or images, as desired by implementation. Examples of artifacts include: model files, source files, scripts (e.g. JAR file), binary executable files, tables in a database system, a development deliverable, and word-processing documents (e.g. text files, configuration files, generated code files, source files, etc.). In some variations, artifacts comprise of other artifacts. As referred to in this document, any general reference to artifacts will imply reference to images unless specifically stated otherwise.

In some variations artifacts and/or images may be stored with sufficient metadata that they may themselves also serve as cache. Such storage may be similar in structure to the cache storage of the cache system 120. In some variations, the artifact and/or image cache(s) may be permanently persisting, alternatively they may be transient. In one implementation of an artifact/image cache, the metadata stored with the artifact/image needs to include: sufficient information to uniquely and universally identify the source target of the artifact/image; sufficient information to identify the path and filename within the environment of that target; and the vertex content-addressable digest (checksum of the definition graph and its inputs). Dependent on implementation, the meta-data may include additional information. This additional meta data information may include repository-related metadata, such as the name of all code repositories involved in building the artifact/image and the respective commit IDs. These are taken into consideration already via the vertex digest; however they can serve as human-readable identifiers to aid with debugging or root-cause finding. In order for the artifacts/images to be compatible with existing artifact and image storage systems (docker registries, artifactories, package managers, etc.), the artifact/images may be stored as native to those systems. The metadata may be optionally also stored in those systems in a form compatible with their data model (e.g., docker labels, maven metadata).

A key limitation which almost all CI systems have today is: given a set of changed files, they cannot automatically infer which integration tests need to be re-run. This often results in running too many integration tests, thus slowing down build times, which impacts developer productivity while also wasting computing resources. By leveraging explicit dependencies, the artifact and image storage system 130 may track the propagation of known modified files across the build mapping to infer which targets are affected by the changes and thus would need to be executed again. In one implementation, artifact/image monitoring may utilize the build mapping. Starting with the build contexts where the files have been changed, a reachability search across the build mapping is done and all reachable vertices are collected. These vertices are then used as targets for builds. The caching logic would prevent any repetition. In a second implementation, integration tests (or some other build goal) need to be predefined as a target depending on all the relevant build targets (possibly containing individual integration tests). This target is then submitted as a build and the caching logic is relied upon to prevent any unaffected integration tests to run again.

In some variations, the system may include a secrets repository 140. Alternatively, the system does not include a secrets repository. In some variations, the secrets repository 140 comprises a cloud repository using a desired encryption (e.g., using a master encryption key vault with user-specific encryption keys). Secrets may be additionally or alternatively be stored/cached locally (e.g., on the developer's local workstation) in another local repository (e.g., secrets daemon). In some variations, the local repository may mirror all the secrets associated with the user on the cloud repository. The local repository is preferably stored on the local disk in an encrypted form but may be alternatively stored unencrypted. Periodic synchronization may enable the local repository to update secrets from the cloud repository. By providing secrets to local builds, the secrets repository 140 may extend the ability to sustain reproducible builds.

In an alternative implementation, secrets may be stored on a local secrets repository 140 which resides entirely in-memory (e.g., in a daemon) and is reconstructed from the cloud-based repository every time that the daemon is started up. The daemon could purge the secrets from memory after a set expiry time or until the workstation is turned off or until the user logs out (and thus the daemon is automatically terminated by the OS or the shell).

The system may enable an easily updatable secrets repository 140, wherein the method(s) of encryptions and keys match currently used platforms and can be readily updated with state-of-the-art advancements in encryption. In one example, a master encryption key may be stored in a vault, database or HSM; which is then used to encrypt user-specific encryption keys when stored at rest in a database. The user-specific encryption keys can then be used for encrypting and decrypting secrets associated with the respective user. Additionally or alternatively, secrets can be cached on the developer's local workstation in another local repository wherein the local repository mirrors all the secrets associated with the user in the cloud.

In some variations, the secrets encryption key is not stored on the disk in clear text (e.g., for security purposes). The encryption key may be stored, either locally or over the cloud, in any desired, preferably secure manner. In a first example, the encryption key may be stored in the cloud, associated with the user, and then retrieved in-memory only when the first build is issued. The key can be kept locally in-memory in a daemon process until a set expiry time or until the workstation is turned off. In a second example, the encryption key is stored on a local disk encrypted using the user's SSH public key. In a third example, the encryption key is stored on a local disk using a user-provided passphrase that the user needs to remember.

Preferably, communication needs to be encrypted (e.g., via TLS) and also needs to be secured by an authentication layer. In one variation, a standard username-password (or email-password) based authentication may be used for the first authentication and a session token can be issued by the server for subsequent requests. Alternatively, an API token may be provided to the user through a web portal. Additionally or alternatively, an authentication mechanism may involve submitting the user's SSH public key together with the username-password, thus associating the SSH key with the user on the cloud platform. Subsequent interactions can then be authenticated by public-private key authentication using the registered SSH public key. This approach may give developers the usability advantage of never having to store SSH keys unencrypted on the local, since cloud developers are generally familiar with securing their private SSH keys and using existing tooling, like ssh-agent.

The secrets repository may additionally enable sharing of secrets between multiple users. For example, secrets may be shared between multiple users through an RBAC system (role-based-access-control), where the ownership of a secret can be associated to a group or a role, rather than a specific user. All users associated with that group or role would have access to those secrets. Additionally, different permission levels could be set: read, write or read-cloud-only. Preferably secrets are automatically obfuscated from output logs if displayed in plain text. In this manner secrets may be shared and implemented by multiple users without displaying the secrets In some variations, particularly cloud-based or hybrid implementations the system may include a core backend. The core backend functions as the system orchestrator by scheduling container execution over the build cluster 110. In this manner the core backend may schedule parts of the build to run and where they should be run. In some variations, the core backend may be aided by the build graph to determine what needs to be executed. Additionally, as discussed above, the build graph may identify points of the build that may be parallelized. The core backend may utilize this information to automatically parallelize the appropriate regions.

As part of a CI implementation, the system may additionally watch for changes of a source control management (SCM) repository (e.g., by polling or via webhooks). That is, the system may include or connect to an associated SCM repository. The system would trigger the build every time the main branch (or other configured branch/branches) of the SCM repository has new changes. As part of the CI system variations, the system could be configured by being provided a list of target references to watch for (in its full, a target reference may already contain a SCM repository reference and an optional branch reference). If the provided target is deemed to depend on other SCM repositories too, the system may be configured to automatically include those dependency targets too, transitively. In this manner, any change to the SCM repository which hosts a dependency target would also trigger a rebuild. The rebuilds may make full use of caching capabilities of the caching system to minimize unnecessary work. Builds may also be triggered manually, by the user, via a CLI or a graphical user interface, with the added possible option to completely ignore any cache, thus forcing everything to execute again. Manually triggered builds may also have the added option to override any build parameters (e.g., build arguments) with manually inputted values.

3. Method

Figure 7:
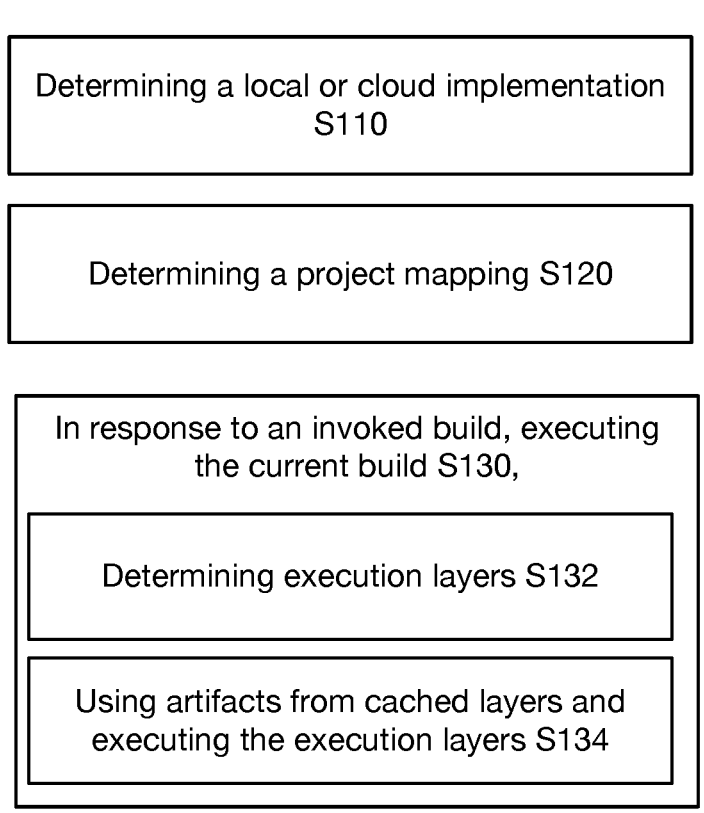
FIG. 7 is a flowchart of an example method.

As shown in FIG. 7 a method for a multi-tenant development platform includes: Determining a hybrid development status for a project build, comprising determining a local or cloud implementation S110; determining a project mapping S120, comprising determining target dependencies; wherein targets comprise executable subcomponents of the project build; and in response to an invoked build of the build project, executing the current build S130, comprising determining execution layers S132, using artifacts from cached layers and executing the execution layers S134. The method may function to provide single and multi-tenant development of a project on a hybrid development platform that may include local and/or cloud-based implementation of the development platform. The method leverages containerized target execution and explicit linear dependencies to provide optimized reproducibility and enable target localized executions of segments of a development project. As the method leverages containerized and isolated target executions, method steps may be called in any order and any number of times. Additionally, method outputs are not unique, thus independent of implementation parameters, each method step may provide a multiplicity of outputs which may further direct how and which method step may be called next. That is, a specific start condition (and/or end condition) implementation of the method may produce different method step calls and/or different intermediary outputs.

The method may be implemented with a system as described above, but may additionally or alternatively, be implemented with any applicable system with appropriate storage and processing components. The method is particularly applicable to a system with containerized execution, wherein "target" subcomponents may be executed independently with only linear dependencies between target subcomponents.

The method may be implemented using a variety of different variations of the method.

Figure 9:
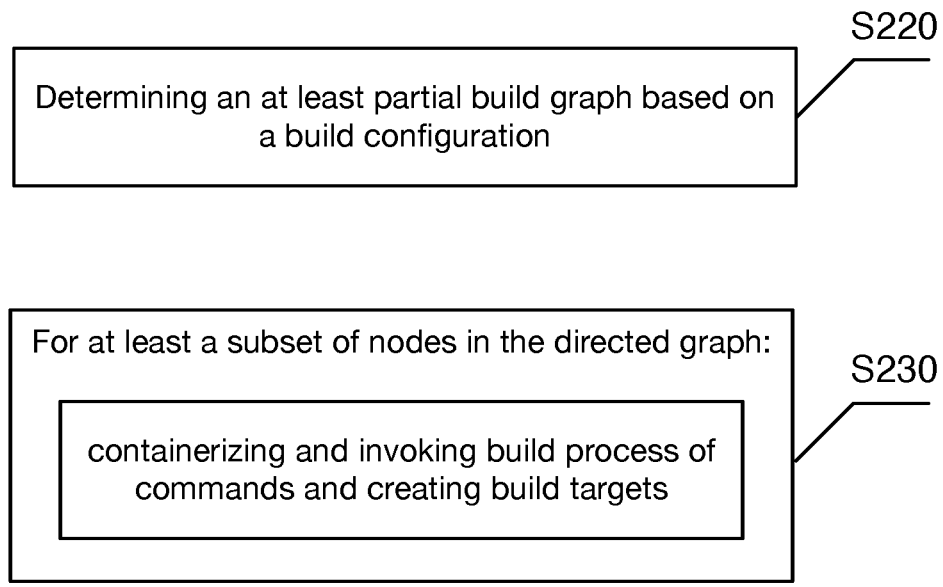
FIG. 9 is a flowchart of a method variation.

In one exemplary variation shown in FIG. 9, the method can include determining an at least partial build graph based on a build configuration (S220), the build configuration defining a set of commands for a set of build targets, and the build graph being a directed graph of command dependencies; and for at least a subset of nodes in the directed graph, containerizing and invoking build process of commands and creating build targets (S230). The build configuration can be a build file or files specifying a set of targets which can include image targets and/or artifact targets. The build graph, as described herein, could be a DAG. The determination of the build graph may be performed after receiving or otherwise retrieving a build configuration. The build configuration can be a build file or a set of build files. In some variations, the build files can be connected via referencing, which may be used in creating arbitrarily complex interdependencies between directories and repositories of an organization.

In another exemplary variation, the method can include determining an at least partial build graph based on a build configuration, the build configuration defining a set of commands for a set of build targets, and the build graph being a directed graph of command dependencies; and for at least a subset of nodes in the directed graph, containerizing and invoking build process of commands and creating build targets, comprising, for at least a subset of branches of the build graph, parallelizing, based on the build graph, containerizing and invoking of the build process. This parallelization variation may function to use inspection of the build graph so that the interdependencies of commands and target build recipes (series of commands) can be used to parallelize and distribute computing tasks. This may also be used to segment and partition build tasks so that caching may be used. Parallelization can be used for enhanced processing in a cloud build cluster, in a multiprocessor computing environment, or in a hybrid environment.

In another exemplary variation, the method can include determining an at least partial build graph based on a build configuration, the build configuration defining a set of commands for a set of build targets, and the build graph being a directed graph of command dependencies; and, for at least a subset of nodes in the directed graph, containerizing and invoking build process of commands and creating build targets, comprising, for at least a subset of nodes, using a cached version of a node in a cache. The build graph can be used in identifying portions of the build process without dependencies such that if there are no changes then they can be reused without processing. Such caching variations can include, upon detecting a change triggering rebuilding a target, reinvoking build process for subsequently connected nodes in the build graph. Prior nodes may, depending on the scenario, use cached versions. Caching can also be used for artifacts. For artifact targets, the method may include caching artifacts using metadata of the artifact.

A major limitation of many CI systems is that they cannot automatically infer which integration tests need to be re-run, given a set of changed files. This often results in running too many integration tests, thus slowing down build times, which impacts developer productivity. In addition, it also wastes computing resources. Due to including explicit dependencies between targets, a dirty tracking algorithm can be used to propagate known modified files across a build graph to infer which targets are affected by the changes and thus would need to be executed again. That is, the method may include determining propagating known modified files across a build graph to infer which targets are affected by changes; thereby reinvoking the build process for subsequently connected nodes in the build graph.

In one example of the dirty tracking algorithm, i.e., an auto-discovery mode: starting with the build contexts where the files have been changed, a reachability search is done across the build graph and all reachable vertices of the build graph are collected. These vertices are then used as targets for builds, wherein the caching logic would prevent any repetition.

In a second example of the dirty tracking algorithm, i.e., a pre-defined target mode: An integration test (or some other build goal) must be initially predefined as a target depending on all the relevant build targets (possibly containing multiple individual integration tests) that are of interest for analysis. This target is then submitted as a build and the caching logic is relied upon to prevent any unaffected integration tests to run again.

As another exemplary variation, the method can include determining an at least partial build graph based on a build configuration, the build configuration defining a set of commands for a set of build targets, and the build graph being a directed graph of command dependencies; for at least a subset of nodes in the directed graph, containerizing and invoking build process of commands and creating build targets; and discovering build graph during invoking of the build process. Discovering the build graph can include updating the build graph in response to invoking the build process. In some instances, a complete build graph may not be fully known in advance. The method can accommodate such a situation by using the current build graph to facilitate invocation of the build process, then, using intermediary results, further expanding the build graph. This can be repeated until an entire build graph has been fully discovered and executed.

As another exemplary variation, the method can include determining an at least partial build graph based on a build configuration, the build configuration defining a set of commands for a set of build targets, and the build graph being a directed graph of command dependencies; for at least a subset of nodes in the directed graph, containerizing and invoking build process of commands and creating build targets; and exposing a secret repository to the build targets. As described herein, secrets (e.g., tokens, keys, credentials) may be exposed and shared with build targets in different ways depending on if the build target is local, remote, or part of a hybrid implementation.

As another exemplary variation, the method can include determining an at least partial build graph based on a build configuration, the build configuration defining a set of commands for a set of build targets, and the build graph being a directed graph of command dependencies; for at least a subset of nodes in the directed graph, containerizing and invoking a build process of commands and creating build targets, comprising distributing the build process in parallel across a plurality of computing resources of a build computing cluster. This functions to use inspection of the build graph so that the interdependencies of commands and target build recipes (series of commands) can be used to parallelize and distribute computing tasks. This may also be used to segment and partition build tasks so that caching may be used.

As another exemplary variation, the method can include determining an at least partial build graph based on a build configuration, the build configuration defining a set of commands for a set of build targets, and the build graph being a directed graph of command dependencies; for at least a subset of nodes in the directed graph, containerizing and invoking build process of commands and creating build targets, comprising implementing build process in a local computing environment. When implemented in local computing environment, the build process may still be parallelized across processes in the computing environment.

As another exemplary variation, the method can include determining an at least partial build graph based on a build configuration, the build configuration defining a set of commands for a set of build targets, and the build graph being a directed graph of command dependencies; for at least a subset of nodes in the directed graph, containerizing and invoking build process of commands and creating build targets, comprising distributing build process in parallel across a plurality of computing resources of a build computing cluster and a local computing environment. This functions to enable a hybrid build process.

As another exemplary variation, the method can include determining an at least partial build graph based on a build configuration, the build configuration defining a set of commands for a set of build targets, and the build graph being a directed graph of command dependencies; determining a build update event based on a code repository; based on the build update event, for at least a subset of nodes in the directed graph, containerizing and invoking build process of commands and creating build targets. In general, the build process can be triggered in response to some request or triggered event. This can be used where polling, webhook, API request, or other event is generated based on some change in a code repository. In a hosted code repository, a cloud build cluster can be used to facilitate faster build processes. This could also be used for build processes using local or hybrid environments.

Figure 10:
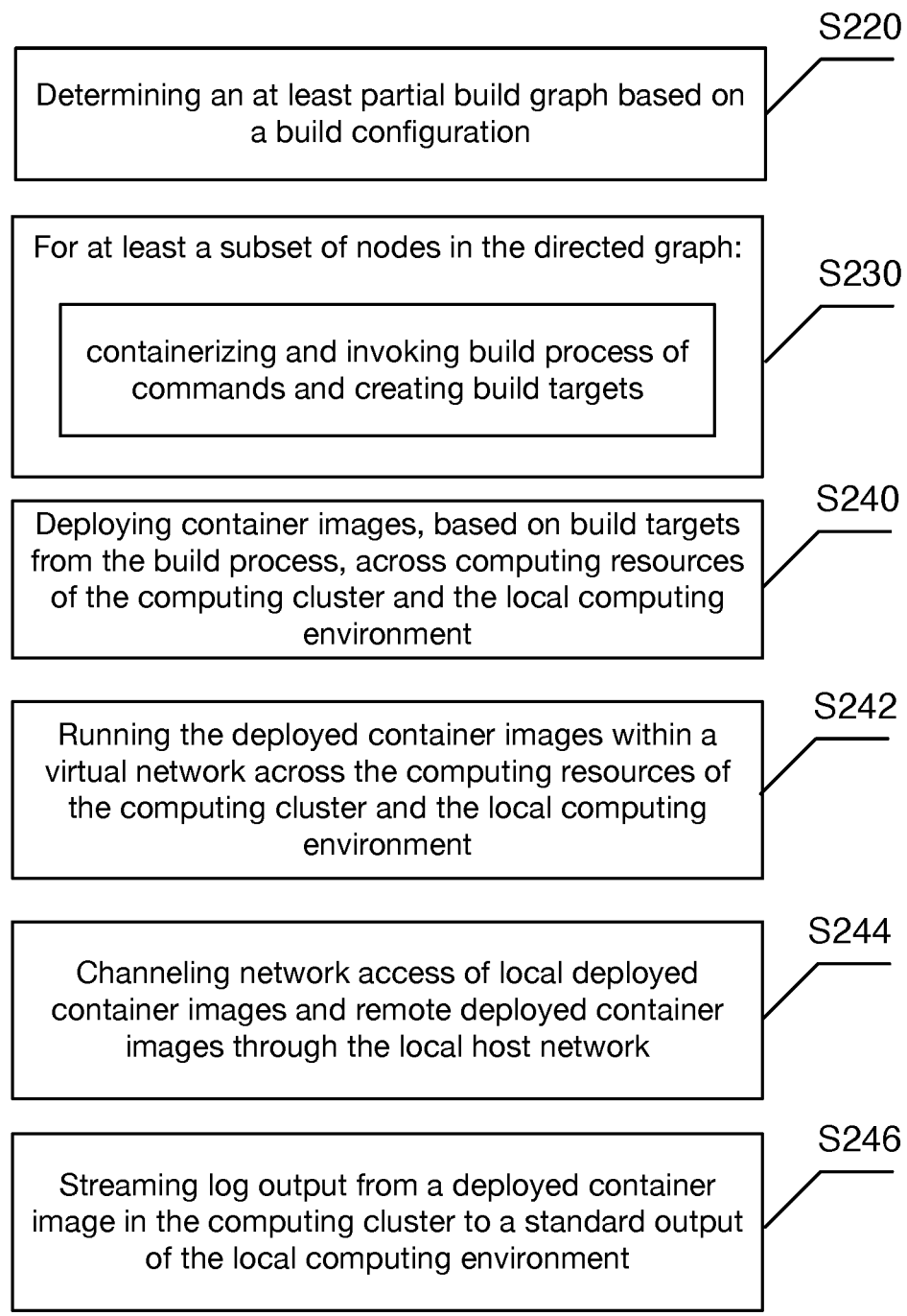
FIG. 10 is a flowchart of a method variation with a hybrid development environment.

As another variation, the method may enable a hybrid deployment of the build across a local computing device and a cloud computing environment. Accordingly, the method, as shown in FIG. 10, may alternatively include: determining an at least partial build graph based on a build configuration, the build configuration defining a set of commands for a set of build targets, and the build graph being a directed graph of command dependencies; for at least a subset of nodes in the directed graph, containerizing and invoking build process of commands and creating build targets; deploying container images based on the build targets from the build process across computing resources of the computing cluster and the local computing environment S240. Here the deployed container images result from the build targets. Deployment of the container images could be automatically triggered in response to changes or updates to the build. The deployment may alternatively be triggered in response to a command or other trigger. The deployment may deploy container images on the local computing environment to the local computing environment and deploy container images in the computing cluster to the computing cluster. This may minimize transfers of build targets and artifacts. Other factors may alternatively be used when determining which computing environment to use for deploying one or more container images.

This variation can additionally include running the deployed container images within a virtual network across the computing resources of the computing cluster and the local computing environment (S242).

Ports of the local host network on the local machine can be exposed to both local deployed container images and remote deployed container images. Accordingly, the method may include channeling network access of local deployed container images and remote deployed container images through the local host network (S244). More specifically, this can include tunneling network access of a deployed container image in the computing cluster to expose listening ports on the local host network.

Logging and other reporting from the deployed container images can additionally be unified. Accordingly, this may include streaming log output from a deployed container image in the computing cluster to a standard output of the local computing environment (S246). This could be streamed through. Log proxy and optionally a hybrid utility tool. Logs from locally deployed container images can be output directly in a standard output.

Figure 11:
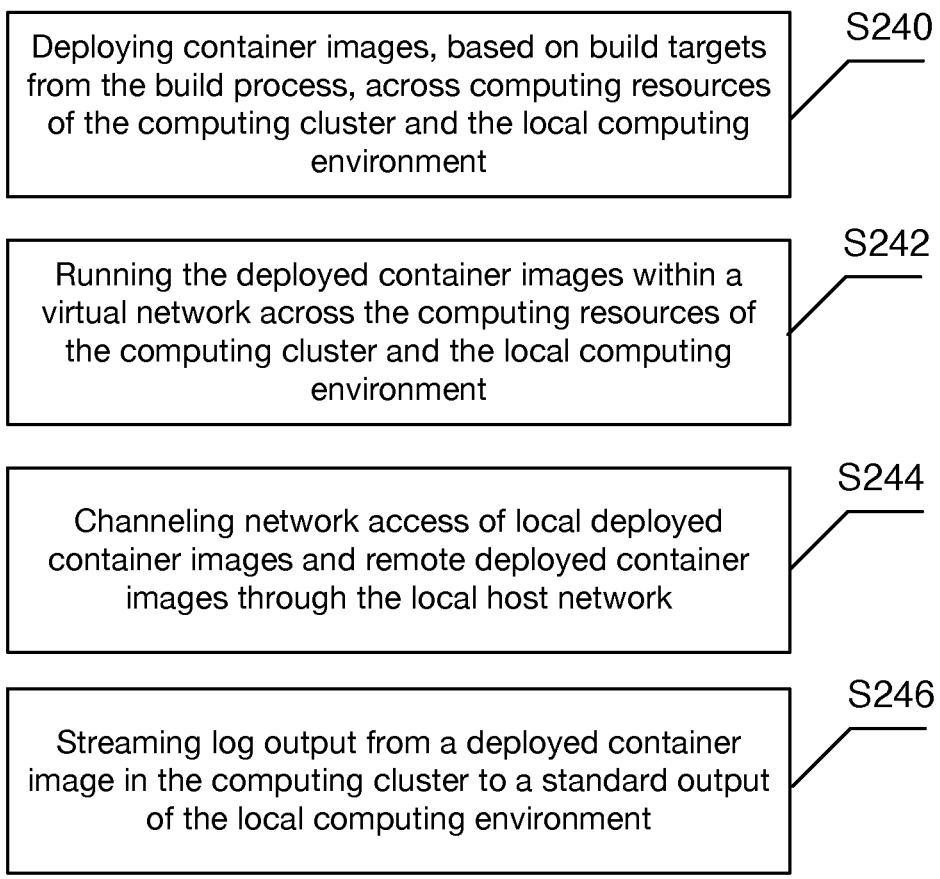
FIG. 11 is a flowchart of a method variation for a hybrid development environment.

As another variation, the method may alternatively be applied to enabling hybrid development environment independent or separate from the build process. Accordingly, as shown in FIG. 11, one variation of the method for a hybrid development environment can include deploying container images of the build targets from the build process across computing resources of the computing cluster and the local computing environment S240; running the deployed container images within a virtual network across the computing resources of the computing cluster and the local computing environment S242; channeling network access of local deployed container images and remote deployed container images through the local host network S244; and streaming log output from a deployed container image in the computing cluster to a standard output of the local computing environment S246.

In some implementations, the user of the build tool may make use of selectable options for use of local, cloud, or hybrid implementation. Other options may additionally exist. Accordingly, some variations of the method may include determining a local or cloud implementation S110, which functions to determine the location of implementation, i.e., local, cloud-based, or hybrid. That is, block S110 enables determination of where targets should be stored, compiled, and executed. Determining a local or cloud implementation S110 may be called at any and all stages of a project development. As desired, and/or appropriate (e.g., for efficiency), the location of implementation may be different for each and every subcomponent (i.e., container) within a project build. In many variations block S110 may be called independently and can also be called as a sub-method of any other method step. In some variations, determining a local or cloud implementation S110 may determine a hybrid (i.e., both local and cloud) implementation.

In some variations of block S110, the user(s) may be initially allowed to login on any number of their own workstations, such that their local session is associated with their account on the platform. During development, block S110 may determine the implementation location through explicit user commands and/or command line flags. In one example of this variation, block S110 may include the following algorithm:

1) If the user is not logged in, execute the build locally only.

2) If the user is logged in: If the flag "-local" was passed on the command line, execute the build locally in its entirety. If the flag "-cloud" was passed on the command line, execute the build in the cloud in its entirety. This can use cloud resources allocated and associated with an account of the logged in user.

3) Otherwise lookup the user's preferences: If the user's preference (as recorded in their account on the platform) are to build locally only, execute the build locally in its entirety. Otherwise execute the build partly locally and partly in the cloud, according to the algorithm as described.

Block S120, which includes determining a project mapping, functions to map explicit dependencies between targets within the project. In preferred variations, the mapping comprises determining a directed graph (e.g., a directed acyclic graph) based on a build configuration. The build configuration can be one or more build file that defines one or more targets which can include images (e.g., Docker images), artifacts (regular files, executables, libraries, etc.), and/or other types of targets. The build configuration can include a set of commands with series of commands defining a set of build targets. Each command can be represented within the directed graph as a vertex with the directed edge indicating dependency. In preferred variations, dependencies are explicitly provided by users/developers that are then incorporated into the project mapping. Block S120 may enable storage of additional information regarding targets. Additional information preferably includes: target references, i.e. a way to find and call the target; target version, and target build parameters.

Determining a project mapping S120 may be called periodically and may provide non-unique project mappings. For any method implementation, block S120 may generate non-unique intermediary mappings. Additionally, targets may be represented multiple times in project mappings. These multiple instances are preferably unique instances (e.g., different version, parameters, location, etc.) of the target. In many variations, any project updates may lead to determining a project mapping S120. Thus, determining a new project mapping S120 may occur directly after an update, after some set periodic time frame, through a user call, through invoking a build (but prior to execution of the build), or through any other set call of block S120.

As part of determining a project mapping S120, dependencies may define "layers" of the project. That is, which targets, with their respective layers, are required for execution of a specific target and which targets are independent or completely disconnected from the final target, and thus be ignored. Through repeated method calls and project development, these layers may change, thereby generating new intermediary mappings of a project.

The project mapping may be stored/cached locally, on the cloud, and/or both. The location of the project mapping storage may be set through determining a local or cloud implementation S110. In some variations, the project mapping may be stored over multiple clusters (e.g., subgraphs of the project mapping store over multiple memory clusters of a storage repository). Storage of the project mapping preferably includes storage of the mapping layers (e.g., versions). In one example, locally executed build layers may be stored locally, while "global" (e.g., daily builds) may be stored on the cloud. In another variation, the entire project mapping is stored in one place (e.g., project repository).

As part of a project development, a build may be invoked. Invoking a build may be a user action, an automated action (e.g., automatic daily build update of a CI) and/or as part of a method step performed through the method in response to a user action. For example, in response to a user set preference, the invoking a build may occur periodically to update the project build. Dependent on the implementation, invoking a build may initially trigger determining a local or cloud implementation S110 and/or determining a project mapping S120, prior to executing the current build S130. In some variations, a build may be invoked concurrent to block S110 and S120. That is, the type of implementation and project mapping may be determined on the fly during build execution. Additionally or alternatively, the build invocation may occur after the type of implementation has been determined and project mapping determined.

Block S130, which includes executing the current build in response to an invoked build, functions to run the current build. Executing the current build 130 may be a local, cloud-based, or hybrid execution. Preferably, executing the current build 130, leverages both blocks S110 and S120, to determine how and what needs to be executed. Executing the current build S130 may include: determining execution layers S132, using artifacts from cached layers and executing the execution layers S134.

Block S132, which includes determining execution layers, functions to determine which inputs have been updated and thus need to be executed. As inputs that have been updated (i.e., current targets) are dependent on targets and dependencies downstream of the current targets on the project mapping, they may also need to be re-executed (provided that intermediate dependencies are now different). Thus, determining execution layers S134 comprises determining what targets have been updated since the previous build and all targets downstream of the updated targets. The method may thus leverage the project mapping to determine all execution layers downstream of the original updated target(s). With use of the project mapping and in complement to the determined execution layers, block S130 may further identify cached layers, i.e., layers that have not changed.

Block S134, which includes using artifacts/images from cached layers and executing the execution layers, functions to actively execute the build. As a default, only the execution layers are executed, since there should be no apparent change to the cached layers, but in preferred variations user implemented preferences may also enable the compiling and the executing of any and/or all cached layers. For example, as part of a daily build update, all targets may be updated and executed at the end of each day. Thus, block S134 may re-compile and re-execute all cached artifacts/images and then cache them again as part of the daily build update.

As part of block S134, executed targets may be cached (e.g., on a local or global repository). This may include updating artifacts/images currently stored for prior builds. Storage of new artifacts/images may replace older versions, or alternatively a new layer (e.g., version) of the artifacts/images may be stored in conjunction with the current build execution.

4. System Architecture

The systems and methods of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMS, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

In one variation, a system comprising of one or more computer-readable mediums storing instructions that, when executed by the one or more computer processors, cause a computing platform to perform operations comprising those of the system or method described herein such as: Determining a local or cloud implementation; determining a project mapping; and executing the current build.

Similarly, in another variation, a non-transitory computer-readable medium storing instructions that, when executed by one or more computer processors of a communication platform, cause the communication platform to perform operations of the system or method described herein such as: Determining a local or cloud implementation; determining a project mapping; and executing the current build.

Figure 12:
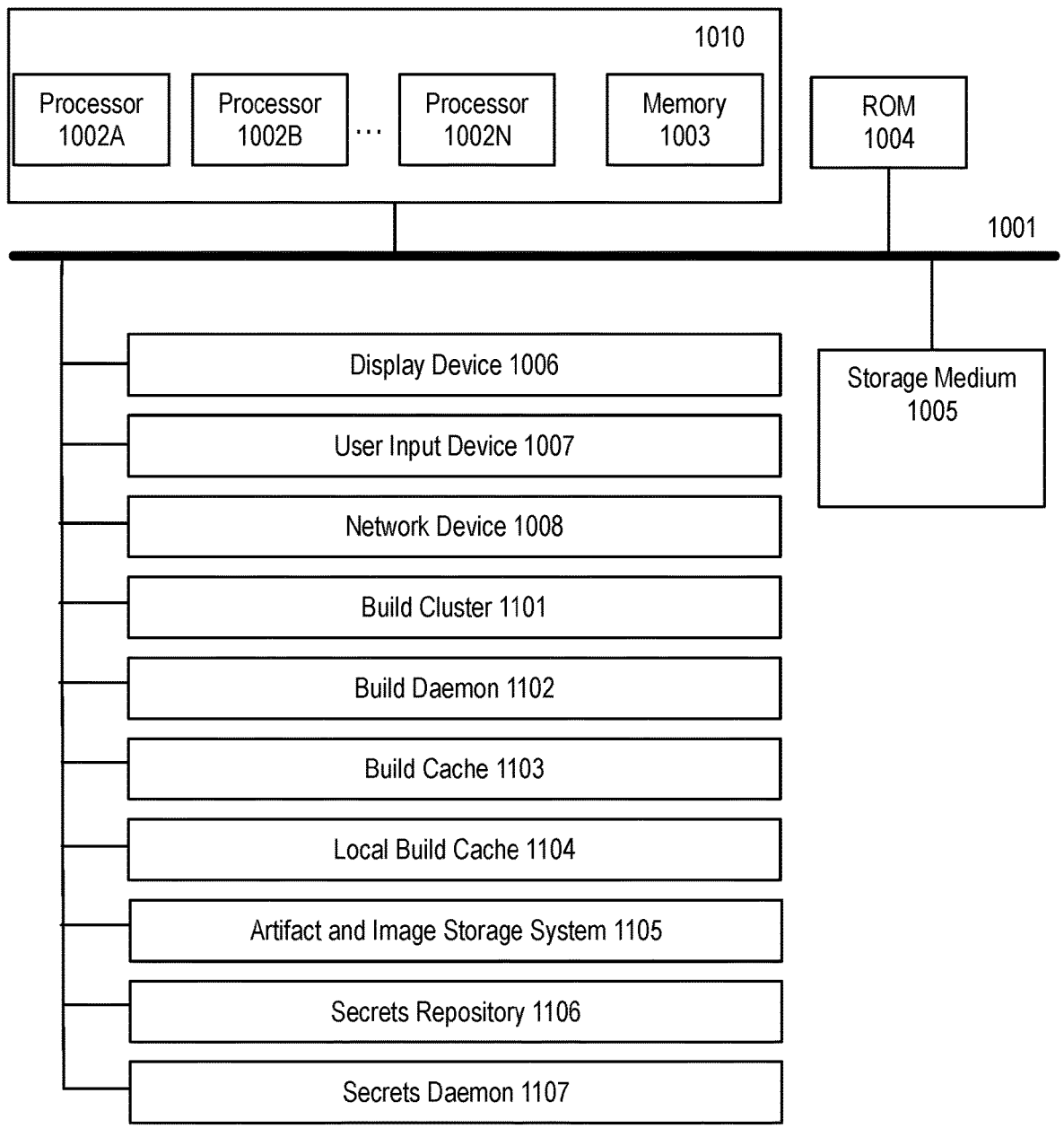
FIG. 12 is an exemplary system architecture that may be used in implementing the system and/or method.

FIG. 12 is an exemplary computer architecture diagram of one implementation of the system. In some implementations, the system is implemented in a plurality of devices in communication over a communication channel and/or network. In some implementations, the elements of the system are implemented in separate computing devices. In some implementations, two or more of the system elements are implemented in same devices. The system and portions of the system may be integrated into a computing device or system that can serve as or within the system.

The communication channel 1001 interfaces with the processors 1002A-1002N, the memory (e.g., a random-access memory (RAM)) 1003, a read only memory (ROM) 1004, a processor-readable storage medium 1005, a display device 1006, a user input device 1007, and a network device 1008. As shown, the computer infrastructure may be used in connecting build cluster 1101, build daemon 1102, build cache 1103, local build cache 1104, artifact and image storage system 1105, secrets repository 1105, secrets daemon 1106 and/or other suitable computing devices.

The processors 1002A-1002N may take many forms, such CPUs (Central Processing Units), GPUs (Graphical Processing Units), microprocessors, ML/DL (Machine Learning/Deep Learning) processing units such as a Tensor Processing Unit, FPGA (Field Programmable Gate Arrays, custom processors, and/or any suitable type of processor.

The processors 1002A-1002N and the main memory 1003 (or some sub-combination) can form a processing unit 1010. In some embodiments, the processing unit includes one or more processors communicatively coupled to one or more of a RAM, ROM, and machine-readable storage medium; the one or more processors of the processing unit receive instructions stored by the one or more of a RAM, ROM, and machine-readable storage medium via a bus; and the one or more processors execute the received instructions. In some embodiments, the processing unit is an ASIC (Application-Specific Integrated Circuit). In some embodiments, the processing unit is a SoC (System-on-Chip). In some embodiments, the processing unit includes one or more of the elements of the system.

A network device 1008 may provide one or more wired or wireless interfaces for exchanging data and commands between the system and/or other devices, such as devices of external systems. Such wired and wireless interfaces include, for example, a universal serial bus (USB) interface, Bluetooth interface, Wi-Fi interface, Ethernet interface, near field communication (NFC) interface, and the like.

Computer and/or Machine-readable executable instructions comprising of configuration for software programs (such as an operating system, application programs, and device drivers) can be stored in the memory 1003 from the processor-readable storage medium 1005, the ROM 1004 or any other data storage system.

When executed by one or more computer processors, the respective machine-executable instructions may be accessed by at least one of processors 1002A-1002N (of a processing unit 1010) via the communication channel 1001, and then executed by at least one of processors 1001A-1001N. Data, databases, data records or other stored forms data created or used by the software programs can also be stored in the memory 1003, and such data is accessed by at least one of processors 1002A-1002N during execution of the machine-executable instructions of the software programs.

The processor-readable storage medium 1005 is one of (or a combination of two or more of) a hard drive, a flash drive, a DVD, a CD, an optical disk, a floppy disk, a flash storage, a solid-state drive, a ROM, an EEPROM, an electronic circuit, a semiconductor memory device, and the like. The processor-readable storage medium 1005 can include an operating system, software programs, device drivers, and/or other suitable sub-systems or software.

As used herein, first, second, third, etc. are used to characterize and distinguish various elements, components, regions, layers and/or sections. These elements, components, regions, layers and/or sections should not be limited by these terms. Use of numerical terms may be used to distinguish one element, component, region, layer and/or section from another element, component, region, layer and/or section. Use of such numerical terms does not imply a sequence or order unless clearly indicated by the context. Such numerical references may be used interchangeable without departing from the teaching of the embodiments and variations herein.

As a person skilled in the art will recognize from the previous detailed description and from the figures and claims, modifications and changes can be made to the embodiments of the invention without departing from the scope of this invention as defined in the following claims.

We claim:

1. A system for a development platform comprising:
a build graph that is a directed graph of build component dependencies based on a build configuration;
a build cluster that comprises one or more computer processors and one or more computer readable mediums configured with instructions that, when executed, cause the one or more computer processors to execute a build process that creates and maintains program builds and build components, wherein the build components are executed in isolated containers by the build cluster, where a linear interdependency of the containers, based on the build graph, is enforced by the build cluster;

a build cache that stores state of the program builds and build components of the build cluster for each vertex of the build graph, and wherein in response to updates of the build process, the build cluster uses stored program builds and build components in the build cache when executing the build process.

2. The system of claim 1, further comprising a Continuous Integration (CI) platform integration, wherein the CI platform integration interfaces with an external CI and updates a build and the build dependencies using the build cluster based on the external CI.

3. The system of claim 1, wherein the build graph is a directed acyclic graph (DAG) of a project, wherein each vertex of the DAG is a command, and each build target of the build graph is defined by a series or set of commands for a targeted build component.

4. The system of claim 1, wherein the system may parallelize target executions based on branches in the build graph.

5. The system of claim 1, wherein the build cluster comprises a cloud-based build platform and a local build daemon, and wherein the cache system comprises a cloud-based build cache and a local build cache.

6. The system of claim 1, further comprising an artifact and image storage system that stores build artifacts and images, wherein the artifacts comprise files resulting from executing targeted build components, and images comprise docker or container images.

7. The system of claim 6, wherein the artifact and image storage system may further store artifacts and images with sufficient meta data such that the artifacts and images themselves may be used as cached artifacts and images during builds of the build cluster.

8. The system of claim 1, further comprising a secret repository that stores project secrets and comprises a local repository that mirrors all the secrets associated with a user on the cloud repository.

9. The system of claim 1, wherein the build process of the build cluster is a parallelized execution process based on the build graph.

* * * * *